US006846858B2

(12) United States Patent
Lemay

(10) Patent No.: US 6,846,858 B2
(45) Date of Patent: Jan. 25, 2005

(54) ARTIFICIAL SOIL COMPOSITION AND METHODS OF ITS MAKING AND USE

(76) Inventor: Brenton L. Lemay, 1302 Martin Rd., Bloomer, WI (US) 54724

( * ) Notice: Subject to any disclaimer, the term of this patent is extended or adjusted under 35 U.S.C. 154(b) by 108 days.

(21) Appl. No.: 10/128,303

(22) Filed: Apr. 24, 2002

(65) Prior Publication Data

US 2003/0203131 A1 Oct. 30, 2003

(51) Int. Cl.[7] ................................................ C05F 11/00
(52) U.S. Cl. ............................. 524/13; 47/59 S; 71/23; 523/132
(58) Field of Search ............................. 71/23; 47/59 S; 523/132; 524/13

(56) References Cited

U.S. PATENT DOCUMENTS

| | | | |
|---|---|---|---|
| 1,871,050 A | 8/1932 | Eveland | |
| 2,881,066 A | 4/1959 | Sproull et al. | 71/29 |
| 2,946,675 A | 7/1960 | Davey et al. | 71/8 |
| 3,356,481 A | 12/1967 | Wininger et al. | 71/9 |
| 4,501,604 A | 2/1985 | Odaira | 71/15 |
| 5,192,354 A | 3/1993 | Drysdale et al. | 71/9 |
| 5,312,661 A * | 5/1994 | Suzuki et al. | 428/36.5 |
| 5,728,192 A * | 3/1998 | Andrew, Jr. | 71/26 |

OTHER PUBLICATIONS

Abstract and English translation of JP 08266148, Oct. 1996.*

* cited by examiner

Primary Examiner—Margaret G. Moore
(74) Attorney, Agent, or Firm—Jacobson Holman

(57) ABSTRACT

A composition or composite structure having an appearance of soil or a soil mixture and method of making and using the composition are disclosed. The composition comprises a mixture of cellulose particles and a binding adhesive. The mixture of cellulose particles may be selected from wood particles, wood chips, sawdust, or a combination thereof. The cellulose particles comprise a plurality of sizes and a plurality of shapes. The cellulose particles may be color-treated, dyed, stained, or bleached to a desired color such as black, dark brown, tan, or a combination thereof. Also disclosed are kits comprising the cellulose particle mixture and an adhesive packaged together with instructions for use.

16 Claims, No Drawings

ARTIFICIAL SOIL COMPOSITION AND METHODS OF ITS MAKING AND USE

BACKGROUND OF THE INVENTION

1. Field of the Invention

This invention generally relates to a composition having an appearance that is similar to soil or a soil mixture and methods of making and using the same.

2. Description of the Related Art

There are many different types of potting soils, mulches, wood chips, soil conditioners, and other soil enhancers available for specific uses such as special soils for seedlings, moss and mulch mixtures for water retention, mixtures for orchids, and soil conditioners for maintaining certain soil chemistries. For example, U.S. Pat. No. 1,871,050 discloses a mulch of wet paper pulp for adding to the soil around plants. U.S. Pat. No. 2,881,066 discloses a process for producing nitrogenated and phosphorylated fertilizer, mulch, and soil conditioner wherein wood-like materials are used. U.S. Pat. No. 2,946,675 discloses sawdust compost and U.S. Pat. No. 3,356,481 discloses a sawdust based soil conditioner. There are a few U.S. patents relating to artificial fertile soil and soil substitutes, such as U.S. Pat. Nos. 4,501,604 and 5,192,354 for supporting plant growth.

None of the prior art potting soils, mulches, wood chips, soil conditioners, and other soil enhancers are suitable for use with artificial plant and flower arrangements as they comprise mixtures of materials that readily decay, mold and mildew. Additionally, the potting soils, mulches, wood chips, soil conditioners, and other soil enhancers comprise mixtures of loose particles that are difficult to clean up when spilled and do not immobilize the plant and flower pieces in a desired arrangement.

Florists typically use a variety of synthetic foams and clays for use with artificial plants and flowers. However, these synthetic foams and clays have an obtrusive synthetic appearance which detracts from the realistic look of the artificial plant and flower arrangements. Thus, a need exists for a composition that has an appearance similar to soil or a soil mixture and is suitable for use with artificial plant and flower arrangements.

SUMMARY OF THE INVENTION

The present invention generally relates to a composition which simulates the appearance of soil or a soil mixture. In some embodiments, the present invention relates to a composition or composite structure having an appearance of soil or a soil mixture comprising a mixture of cellulose particles and an adhesive to bind the particles together into the desired structure form. The mixture of cellulose particles may be selected from wood particles, wood chips, sawdust, or a combination thereof. The mixture of cellulose particles may comprise a plurality of sizes and a plurality of shapes.

In the preferred embodiments, the composition comprises a mixture of cellulose particles in which about one-third have a size of about $1/16$ inch or less, about one-third have a size of about $1/16$ to about $1/8$ inch, and about one-third have a size of about $1/8$ to about 1 inch. In a more preferred embodiment, the about one-third of cellulose particles comprising the largest size has a size of about $1/4$ inch.

The mixture of cellulose particles may be selected from maple, birch, beech, aspen, pine, basswood, wood waste, recycled wood products, or combinations thereof. The mixture of cellulose particles may also comprise a plurality of any desired shapes, including shapes selected from the group consisting of flat, square, oval, round, rectangular, toothpick-like, and a combination thereof. The mixture of cellulose particles are preferably color-treated, dyed, stained, or bleached to a desired color such as black, dark brown, tan, or a combination thereof. The composition of the present invention may also comprise at least one agent which prevents or inhibits decay, mold, mildew, or a combination thereof. In the preferred embodiments, the adhesive to bind the cellulose particles is clear when dry.

In other embodiments, the present invention relates to a kit for making a synthetic soil or soil-like composition which comprises, as a first component, a mixture of the desired cellulose particles and, as a second component, a desired adhesive for binding the particles. The two components are then packaged together with instructions for use as a kit. In the preferred embodiments, the adhesive dries clear, and the mixture of cellulose particles may be selected from wood particles, wood chips, sawdust, or a combination thereof. The mixture of cellulose particles may comprise a plurality of sizes and a plurality of shapes.

In the preferred embodiments, the composition comprises a mixture of cellulose particles in which about one-third have a size of about $1/16$ inch or less, about one-third have a size of about $1/16$ to about $1/8$ inch, and about one-third have a size of about $1/8$ to about 1 inch. In a preferred embodiment, the about one-third component of cellulose particles comprising the largest size has a size of about $1/4$ inch.

The cellulose particles may be selected from maple, birch, beech, aspen, pine, basswood, wood waste, recycled wood products, or combinations thereof. The cellulose particles may also comprise a plurality of any desired shapes, including shapes selected from the group consisting of flat, square, oval, round, rectangular, toothpick-like, and a combination thereof. The cellulose particles may be color-treated, dyed, stained, or bleached to a desired color such as black, dark brown, tan, or a combination thereof. Alternatively, a coloring agent may be included in the kit. The kit of the present invention may also include at least one agent which prevents or inhibits decay, mold, mildew, or a combination thereof.

In some embodiments, the present invention relates to methods of making a composition or composite structure having an appearance of soil or a soil composition which comprises admixing a mixture of cellulose particles with an adhesive. The method may further comprise treating the mixture of cellulose particles with a coloring agent before adding the adhesive.

It is to be understood that both the foregoing general description and the following detailed description are exemplary and explanatory only and are intended to provide further explanation of the invention.

DETAILED DESCRIPTION OF THE INVENTION

The present invention provides a composition having an appearance that is similar to soil or a soil mixture and methods of making and using the composition. The composition simulates the appearance of soil or soil mixtures that may be used in artificial plant and flower industries and other industries such as arts and crafts and taxidermy. Unlike prior art artificial soil compositions and additives, the composition of the present invention provides no nutritional value to real plants. Additionally, the composition of the present invention provides no soil conditioning value and may be harmful to real plants. The composition of the present invention may be used to enhance the realistic look of artificial plants and flowers and other crafts such as miniature railroad models.

The composition of the present invention is a mixture comprising cellulose particles such as wood particles and chips, sawdust, and the like. The size of the cellulose particles may vary according to the desired appearance. Preferably, the composition of the present invention comprises a mixture of cellulose particles having varying sizes. More preferably, the composition of the present invention comprises a mixture of cellulose particles wherein about one-third of the particles have a size of about 1/16 inch or less, about one-third of the particles have a size of about 1/16 to about 1/8 inch, and about one-third of the particles have a size of about 1/8 to about 1 inch. Even more preferably, the largest third of the cellulose particles have a size of about 1/4 inch.

The composition of the present invention may comprise cellulose particles having one shape or a variety of shapes. The shapes of the cellulose particles include flat, square, round, and toothpick-like shapes. Sources of the cellulose particles include woody plants and trees such as maple, birch, beech, aspen, pine, and basswood. Other sources of the cellulose particles include wood waste and recycled wood products. The cellulose particles may be manufactured or purchased from sawmills and other wood product manufacturers.

The cellulose particles may be color-treated, dyed, stained, or bleached to a desired color. Thus, the composition of the present invention may comprise at least one coloring agent. Suitable coloring agents include any dye, stain, pigment or color-altering agent that changes the color of cellulose particles. The coloring agent may be used according to conventional methods in the art. Preferably, any water used as a carrier for the dye, stain, pigment or color-altering agent is boiled or treated to eliminate, prevent, or inhibit organisms which cause decay, mold, mildew, or a combination thereof, to the cellulose particles.

The composition of the present invention further includes at least one adhesive to bind the cellulose particles into any desired composite or solid shape. Any adhesive may be used; however, preferred adhesives should not affect the color or shape of the cellulose particles and dry clear. Examples of suitable adhesives include school glue, wood glue, epoxy, paste, mucilage, and other general adhesives. The adhesive is not added to the cellulose materials until use.

At least one agent, which prevents or inhibits decay, mold, or mildew, such as antibacterials, antifungals, and the like, may be added to the cellulose particles, the coloring agent or water, the adhesive, or a combination thereof. Other suitable agents that can be used as mold or mildew preventatives include those commercially available by Captain PHAB Ltd. of Ontario, Canada, and those available for use in the marine and auto upholstery industry. The agent may be added in a form that simulates soil or soil mixtures. For example, the agent may be in the form of small particles or on small carrier particles such as vermiculite.

The composition of the present invention may be provided in the form of a kit, wherein the cellulose particles and adhesive are packaged as separate components and the two components are then packaged together for storage until use. The cellulose particles in the kit may be pre-colored. Alternatively, at least one coloring agent may be separately included in the kit so that an individual may change the color of the cellulose materials as desired. The kit may further include directions for making and using the composition.

The present invention also relates to the method of making the composition of the present invention. In preferred embodiments, one need only add the adhesive to the cellulose particles if the cellulose particles are already in the desired color. However, a detailed protocol for making the composition of the present invention is disclosed in Example 1 and is exemplary and explanatory only, as some of the steps may not be required.

EXAMPLE 1

Method for Making the Composition

The cellulose particles were prepared for color treatment. Specifically, the moisture content of the cellulose particles was determined and adjusted for optimal results by drying the cellulose particles sufficiently for the desired dye, stain, or pigment absorption. Conditioners such as wood conditioners may be used for enhancing the color treatment. The various sizes and shapes of the cellulose materials may also be adjusted as desired within the parameters described hereinbefore.

A dye suitable for natural fibers such as cotton and wood was used. Specifically, 1 ounce of brown dye and 1 ounce of black dye was added to 1 gallon of hot water and stirred to give a solution. It should be noted, however, that various colors and amounts of coloring agents may be used to achieve a desired color and appearance. Additionally, the ratio of coloring agent and water will vary with the source and age of the cellulose particles. Nevertheless, the types and amounts of coloring agents may be readily determined by one of ordinary skill in the art with conventional methods.

The solution was then mixed with the cellulose particles until the color of the cellulose particles was uniform. It should be noted, however, that the amount of cellulose particles and the period of time for mixing will vary according to the desired appearance. The amounts and times may be readily determined by one of ordinary skill in the art by conventional methods. For example, if the cellulose particles mixed into the solution are very wet, more cellulose particles may be added which will create several color tones ranging from black, to dark brown, to tan. Vermiculite may be added at this point.

Then moisture content was determined. The moisture content of the colored cellulose particles was adjusted to a moisture content of about 10% to about 25% and then placed into a container such as a plastic bag until further use. It is important to note that a moisture content of about 10% to about 25% is preferred as the cellulose particles may be stored in a container without the need for the addition of an agent which prevents decay, mold, mildew, or a combination thereof.

The colored cellulose particles were then mixed with an adhesive in a ratio of about 6 parts cellulose particles to about 1 part adhesive. The mixture of cellulose particles and adhesive was placed in a container and positioned around the stems of a plant or floral arrangement and allowed to dry.

The foregoing descriptions and examples should be considered as illustrative only of the principles of the invention. Since numerous applications of the present invention will readily occur to those skilled in the art, it is not desired to limit the invention to the specific examples disclosed or the exact construction and operation shown and described. Rather, all suitable modifications and equivalents may be resorted to, falling within the scope of the invention.

What is claimed is:

1. A composition having an appearance of soil or a soil mixture for use with artificial plants comprising a mixture of cellulose particles and an adhesive, wherein the cellulose particles are selected from the group consisting of wood particles, wood chips, and sawdust, and wherein the mixture of cellulose particles comprises about one-third having a size of about {fraction (1/16)} inch or less, about one-third having a size of about {fraction (1/16)} to about 1/8 inch, and about one-third having a size of about 1/8 to about 1 inch.

2. The composition of claim 1, wherein the one-third of cellulose particles having the largest size have a size of about 1/4 inch.

3. The composition of claim 1, wherein the mixture of cellulose particles are selected from the group consisting of maple, birch, beech, aspen, pine, basswood, wood waste, and recycled wood products.

4. The composition of claim 1, wherein the mixture of cellulose particles comprise a plurality of shapes selected from the group consisting of flat, square, oval, round, rectangular, toothpick-like, and a combination thereof.

5. The composition of claim 1, wherein the mixture of cellulose particles are color-treated, dyed, stained, or bleached to a desired color.

6. The composition of claim 5, wherein the desired color is black, dark brown, tan, or a combination thereof.

7. The composition of claim 1, and further comprising at least one agent which prevents or inhibits decay, mold, mildew, or a combination thereof.

8. The composition of claim 1, wherein the adhesive is clear when dry.

9. A kit comprising a mixture of cellulose particles and an adhesive packaged together with instructions for use, wherein the mixture of cellulose particles comprises a plurality of sizes and a plurality of shapes, and wherein said mixture of cellulose particles comprise about one-third having a size of about {fraction (1/16)} inch or less, about one-third having a size of about {fraction (1/16)} to about 1/8 inch, and about one-third having a size of about 1/8 to about 1 inch.

10. The kit of claim 9, wherein the mixture of cellulose particles are selected from the group consisting of maple, birch, beech, aspen, pine, basswood, wood waste, and recycled wood products.

11. The kit of claim 9, wherein the mixture of cellulose particles comprise a plurality of shapes selected from the group consisting of flat, square, oval, round, rectangular, toothpick-like, and a combination thereof.

12. The kit of claim 9, which further comprises at least one coloring agent.

13. A method of making a solid composition having an appearance of soil or a soil composition for use with artificial plants which comprises mixing cellulose particles and an adhesive, wherein the cellulose particles are selected from the group consisting of wood particles, wood chips, and sawdust, and wherein the mixture of cellulose particles comprises about one-third having a size of about {fraction (1/16)} inch or less, about one-third having a size of about {fraction (1/16)} to about 1/8 inch, and about one-third having a size of about 1/8 to about 1 inch.

14. The method of claim 13, wherein the cellulose particles are colored black, dark brown, tan, or a combination thereof.

15. A kit for preparing an artificial soil composition for use with artificial plants comprising:

a) A first part containing cellulose particles, wherein the cellulose particles are selected from the group consisting of wood particles, wood chips, and sawdust, and wherein the mixture of cellulose particles comprises about one-third having a size of about {fraction (1/16)} inch or less, about one-third having a size of about {fraction (1/16)} to about 1/8 inch, and about one-third having a size of about 1/8 to about 1 inch; and b) A second part containing an adhesive, and packaged together with instructions for use.

16. The kit of claim 15, further comprising a third part containing a coloring agent.

* * * * *